J. A. LOWE.

Water-Traps.

No. 5,953. Reissued June 30, 1874.

Witnesses
John Becker
Fred. Haynes

James A. Lowe
by his Attorneys
Brown & Allen

A.M. PHOTO-LITHOGRAPHIC Co. N.Y. (OSBORNE'S PROCESS.)

UNITED STATES PATENT OFFICE.

JAMES A. LOWE, OF NEW YORK, N. Y.

IMPROVEMENT IN WATER-TRAPS.

Specification forming part of Letters Patent No. 26,506, dated December 20, 1859; extended seven years; reissue No. 5,953, dated June 30, 1874; application filed June 22, 1874.

*To all whom it may concern:*

Be it known that I, JAMES A. LOWE, of the city, county, and State of New York, have invented an Improvement in Water-Traps, of which the following is a specification:

This invention consists in a trap made wholly of cast lead, or alloy, the equivalent thereof. Prior to this invention the only practicable method known of manufacturing lead traps was by forming the trap in longitudinal halves or sections from rolled lead, which sections were afterward united by solder that was liable to be eaten away by the acids to which the traps were sometimes exposed, and otherwise weakened the construction; also interfered with uniformity of expansion and contraction throughout the trap, besides which the act of soldering involved great particularity, expense, and labor. By making the trap wholly of cast-lead these objections are altogether avoided, or mainly so, and the trap may be made thicker where more strength is required.

Figure 1:
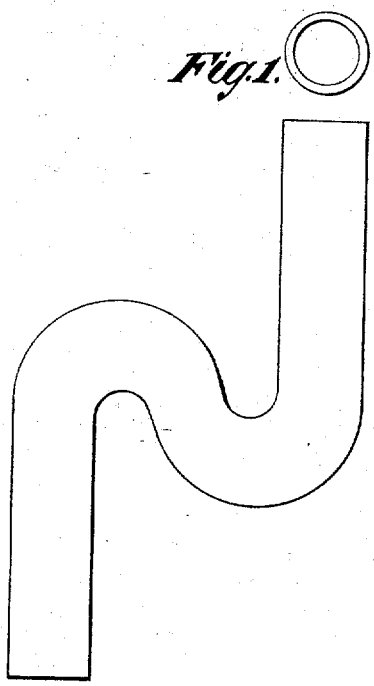
Figure 2:
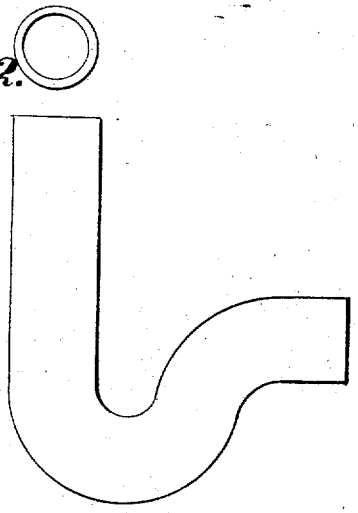
Figure 3:
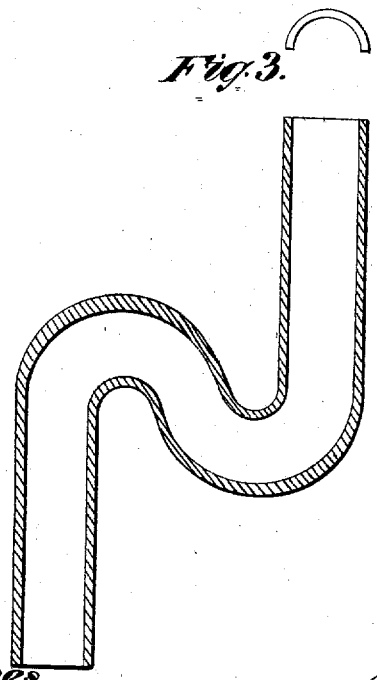
Figure 4:
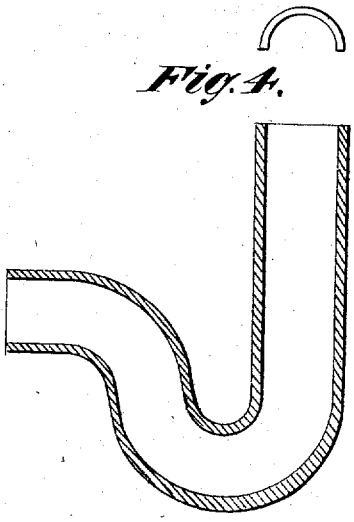

Figures 1 and 2 represent side views and end views or profiles of an S and double S cast-lead trap; Figs. 3 and 4, longitudinal sections thereof, and end views or profiles of said sections.

The traps may be cast in a metallic mold with a metallic core constructed and operating as described in Letters Patent No. 25,572, originally issued to me September, 27, 1859, and since extended, and by which method of manufacture a trap of great strength is obtained, and being of one piece of metal, a trap having a smooth interior of equal size all through is produced, and hence less liable to choke or stop up. Likewise, as hereinbefore referred to, the exposure of the traps to acids, as, for instance, in water-closets, will not affect them, inasmuch as they can be made of pure lead, while as lead traps were made prior to this invention, the seams on the sides where the two pieces were soldered together frequently parted by the acid eating the tin out of the solder and weakening it. In my improvement, the trap being wholly of lead, this defect is avoided.

Furthermore, in freeing traps when stopped, which is usually done by fitting a plunger in the upright part of the trap, and working water into the latter till the obstruction is forced out, it often occurs that an inexperienced person will strike the bend below, and it, having been of thin sheet-metal, easily parts and destroys the trap. To obviate this, the traps shown in the drawing are of increased thickness in the outer portion of the bend, the casting of the trap readily admitting of such provision. Such a trap, in addition to its greater durability, can be furnished at a much less cost than the lead traps as made prior to this invention.

I claim—

1. A water-trap, made entirely of cast-lead, substantially as specified.

2. The water-trap shown, when cast without a seam, in lead or alloy, as a new article of manufacture.

3. A lead trap, made of increased thickness in the bend, substantially as described.

JAMES A. LOWE.

Witnesses:
HENRY T. BROWN,
FRED. HAYNES.